(12) United States Patent
Wada et al.

(10) Patent No.: US 9,365,445 B2
(45) Date of Patent: Jun. 14, 2016

(54) METHOD FOR PRODUCING PHOSPHOR-ENCAPSULATING CAPILLARY TUBE, PHOSPHOR-ENCAPSULATING CAPILLARY TUBE, WAVELENGTH-CONVERTING MEMBER, AND METHOD FOR PRODUCING WAVELENGTH-CONVERTING MEMBER

(75) Inventors: Masanori Wada, Otsu (JP); Sotohiro Nakajima, Otsu (JP); Tomoaki Kawamura, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 656 days.

(21) Appl. No.: 13/805,058

(22) PCT Filed: Jul. 11, 2011

(86) PCT No.: PCT/JP2011/065765
§ 371 (c)(1),
(2), (4) Date: Dec. 18, 2012

(87) PCT Pub. No.: WO2012/014663
PCT Pub. Date: Feb. 2, 2012

(65) Prior Publication Data
US 2013/0108811 A1 May 2, 2013

(30) Foreign Application Priority Data

Jul. 28, 2010 (JP) .................. 2010-168941
Feb. 14, 2011 (JP) .................. 2011-028500

(51) Int. Cl.
| | | |
|---|---|---|
| A47G 19/22 | (2006.01) | |
| C03B 23/13 | (2006.01) | |
| C03B 23/09 | (2006.01) | |
| G02F 1/1335 | (2006.01) | |

(52) U.S. Cl.
CPC .............. *C03B 23/13* (2013.01); *C03B 23/099* (2013.01); *G02F 1/133617* (2013.01); *Y10T 428/131* (2015.01)

(58) Field of Classification Search
CPC . C03B 23/099; C03B 23/13; G02F 1/133617; Y10T 428/131
USPC ........................................................ 428/34.4
See application file for complete search history.

(56) References Cited

U.S. PATENT DOCUMENTS 3,119,176 A * 1/1964 Buesseler et al. ............... 29/592
6,249,264 B1 6/2001 Sano et al.
(Continued)

FOREIGN PATENT DOCUMENTS

| CN | 101510494 A | 8/2009 |
|---|---|---|
| JP | 06-263465 A | 9/1994 |

(Continued)

OTHER PUBLICATIONS

Official Communication issued in corresponding Japanese Patent Application No. 2011-151476, mailed on Jan. 13, 2015.
(Continued)

*Primary Examiner* — James Yager
(74) *Attorney, Agent, or Firm* — Keating and Bennett, LLP

(57) ABSTRACT

Provided are a method for producing a phosphor-encapsulating capillary tube in which, when a phosphor is encapsulated thereinto, fluorescence from the phosphor is less likely to leak from an end of the capillary tube; and such a phosphor-encapsulating capillary tube. One end portion 10A of an elongate glass capillary tube 10 having an outer shape of a transverse cross-section elongated in a width direction thereof is heated until the one end portion 10A of the glass capillary tube 10 has been melted, integrated, and thus sealed.

7 Claims, 14 Drawing Sheets

(56) References Cited

U.S. PATENT DOCUMENTS

| | | |
|---|---|---|
| 2001/0019318 A1 | 9/2001 | Sano et al. |
| 2001/0026255 A1 | 10/2001 | Sano et al. |
| 2007/0189698 A1* | 8/2007 | Takeuchi ................ G02B 6/30 385/137 |

FOREIGN PATENT DOCUMENTS

| | | |
|---|---|---|
| JP | 11-213896 A | 8/1999 |
| JP | 2007-025285 A | 2/2007 |
| JP | 2007-157599 A | 6/2007 |
| JP | 2007-225462 A | 9/2007 |

OTHER PUBLICATIONS

English translation of Official Communication issued in corresponding International Application PCT/JP2011/065765, mailed on Feb. 7, 2013.

Official Communication issued in International Patent Application No. PCT/JP2011/065765, mailed on Sep. 20, 2011.

* cited by examiner

METHOD FOR PRODUCING PHOSPHOR-ENCAPSULATING CAPILLARY TUBE, PHOSPHOR-ENCAPSULATING CAPILLARY TUBE, WAVELENGTH-CONVERTING MEMBER, AND METHOD FOR PRODUCING WAVELENGTH-CONVERTING MEMBER

TECHNICAL FIELD

This invention relates to a method for producing a phosphor-encapsulating capillary tube, a phosphor-encapsulating capillary tube, a wavelength-converting member, and a method for producing a wavelength-converting member.

BACKGROUND ART

In recent years, much development has been made of white light sources for use in, for example, backlights of liquid crystal displays, as well as other applications. For example, Patent Literature 1 below discloses, as an example of such a white light source, a light source in which a wavelength-converting member is disposed on a light-emitting side of an LED (light emitting diode) for emitting a blue light and absorbs part of the light from the LED to emit a yellow light. Emitted from this light source is a white light which is a synthesized light of the blue light emitted from the LED and then having transmitted through the wavelength-converting member and the yellow light emitted from the wavelength-converting member.

CITATION LIST

Patent Literature

Patent Literature 1: JP-A 2007-25285
Patent Literature 2: JP-A 2007-225462

SUMMARY OF INVENTION

Technical Problem

Meanwhile, liquid crystal display backlights come in direct type and edge-lit type. The direct backlight has the advantage of easily providing a relatively high intensity but has the disadvantage of being likely to become a large thickness dimension because of stacking of a surface light source and a diffuser. On the other hand, in the edge-lit backlight, a light source is disposed laterally to a light guide. For this reason, the edge-lit backlight has the advantage of being more easily thinned than the direct backlight. Therefore, the edge-lit backlight is used much in applications strongly required to be thin, such as a liquid crystal display for a cellular phone and a liquid crystal display for a notebook computer.

This edge-lit backlight must allow light to evenly enter a side surface of the light guide in order to provide a uniform planar light having small intensity variations. For this reason, a white linear light source is suitably used in the edge-lit backlight.

A conceivable white linear light source is, for example, one including a plurality of linearly arranged LEDs for emitting a blue light (hereinafter, referred to as "blue LEDs") and a linear wavelength-converting member disposed in front of the plurality of blue LEDs. A conceivable linear wavelength-converting member is, for example, one including a capillary tube and a phosphor encapsulated in the capillary tube.

For example, Patent Literature 2 above discloses, as a method capable of producing such a linear wavelength-converting member, a method in which a liquid sample is injected into a glass capillary tube sealed at one end portion and the glass capillary tube is then sealed at the opposite side by cutting away another end portion thereof by heating with a burner.

Alternatively, another conceivable example is to produce a linear wavelength-converting member by injecting a liquid sample into a glass capillary tube sealed at one end portion and then sealing the other end portion of the glass capillary tube by fusion-bonding or adhesively bonding a flat glass plate thereto.

However, wavelength-converting members produced by these methods have a problem in that fluorescence leaks from the ends of the glass capillary tube to lower the efficiency of light extraction in a direction perpendicular to the longitudinal direction of the wavelength-converting member.

The present invention has been made in view of the above point and is intended to provide a method for producing a phosphor-encapsulating capillary tube in which, when a phosphor is encapsulated thereinto, fluorescence from the phosphor is less likely to leak from an end of the capillary tube; and such a phosphor-encapsulating capillary tube.

Solution to Problem

A method for producing a phosphor-encapsulating capillary tube according to the present invention relates to a method for producing a phosphor-encapsulating capillary tube which is sealed at one end portion thereof and open at the other end portion thereof and into which a phosphor is to be encapsulated through the other end portion thereof. The method for producing a phosphor-encapsulating capillary tube according to the present invention includes a heating step. The heating step is the step of heating one end portion of an elongate glass capillary tube having an outer shape of a transverse cross-section elongated in a width direction thereof until the one end portion has been melted, integrated, and thus sealed. In the method for producing a phosphor-encapsulating capillary tube according to the present invention, a light emitted from the encapsulated phosphor toward the end portion of the phosphor-encapsulating capillary tube is suitably reflected to the inside of the phosphor-encapsulating capillary tube. Then, part of the reflected light is emitted from the sidewall of the phosphor-encapsulating capillary tube. Therefore, with the method for producing a phosphor-encapsulating capillary tube according to the present invention, a phosphor-encapsulating capillary tube can be produced in which fluorescence from the encapsulated phosphor is less likely to leak from an end of the capillary tube so that the efficiency of light extraction from the tube wall of the capillary tube can be increased.

In the method for producing a phosphor-encapsulating capillary tube according to the present invention, a rectangular glass capillary tube is preferably used as the glass capillary tube.

In the method for producing a phosphor-encapsulating capillary tube according to the present invention, in the heating step the one end portion of the glass capillary tube is preferably heated so that the dimension of the one end portion of the glass capillary tube in the width direction gradually decreases toward a distal end thereof and the dimension of the one end portion of the glass capillary tube in a thickness direction perpendicular to the width direction gradually increases and then gradually decreases toward the distal end thereof.

In the method for producing a phosphor-encapsulating capillary tube according to the present invention, in the heating step the one end portion of the glass capillary tube is preferably heated so that the maximum dimension of the one end portion of the glass capillary tube in the thickness direction is 1.1 to 3.0 times the dimension of the remaining portion of the glass capillary tube except for the one end portion along the thickness direction.

Alternatively, in the method for producing a phosphor-encapsulating capillary tube according to the present invention, in the heating step the one end portion of the glass capillary tube is preferably heated so that each of the dimension of the one end portion of the glass capillary tube in the width direction and the dimension thereof in a thickness direction perpendicular to the width direction gradually decreases toward a distal end thereof. In this case, in the heating step the maximum dimension of the one end portion of the glass capillary tube in the thickness direction becomes less than the dimension of the remaining portion of the glass capillary tube except for the one end portion along the thickness direction.

In the method for producing a phosphor-encapsulating capillary tube according to the present invention, the heating step preferably includes: a first heating step of moving a heating means above and across the one end portion of the glass capillary tube to heat and seal the one end portion of the glass capillary tube; and a second heating step of moving the heating means above and across the one end portion of the glass capillary tube in the reverse direction to the first heating step to heat the one end portion of the glass capillary tube again.

In the method for producing a phosphor-encapsulating capillary tube according to the present invention, in the first and second heating steps the heating temperature and the moving speed of the heating means are preferably set to avoid that the one end portion of the glass capillary tube becomes larger in size than the remaining portion of the glass capillary tube except for the one end portion.

In the method for producing a phosphor-encapsulating capillary tube according to the present invention, in the first and second heating steps the heating means is preferably moved in the thickness direction of the glass capillary tube.

In the method for producing a phosphor-encapsulating capillary tube according to the present invention, a laser radiation device may be used as the heating means. In this case, the one end portion of the glass capillary tube is preferably heated by irradiating the one end portion of the glass capillary tube with a laser using the laser radiation device.

In the method for producing a phosphor-encapsulating capillary tube according to the present invention, the laser radiation device used is preferably a laser radiation device in which the shape of a spot of a laser light is an elongate shape elongated in the width direction of the glass capillary tube.

In the method for producing a phosphor-encapsulating capillary tube according to the present invention, the laser radiation device used is preferably a laser radiation device that emits a laser light of such a spot shape that the time for radiation of the laser light to the one end portion of the glass capillary tube in the first and second heating steps is constant in a direction perpendicular to a direction of movement of the laser radiation device.

In the method for producing a phosphor-encapsulating capillary tube according to the present invention, the laser radiation device used is preferably a laser radiation device that emits a laser light the intensity of which is approximately constant in a middle portion of a spot of the laser light in the width direction of the glass capillary tube.

In the method for producing a phosphor-encapsulating capillary tube according to the present invention, a burner may be used as the heating means.

A first phosphor-encapsulating capillary tube according to the present invention is one produced by the method for producing a phosphor-encapsulating capillary tube according to the present invention. Thus, fluorescence from the encapsulated phosphor is less likely to leak from an end of the capillary tube. Therefore, by forming a wavelength-converting member using the first phosphor-encapsulating capillary tube according to the present invention, the efficiency of light extraction from the tube wall of the wavelength-converting member can be increased. As a result, by using this wavelength-converting member, a high-intensity edge-lit backlight can be achieved.

A second phosphor-encapsulating capillary tube according to the present invention is a phosphor-encapsulating capillary tube which is sealed at one end portion thereof and open at the other end portion thereof and into which a phosphor is to be encapsulated through the other end portion thereof. The second phosphor-encapsulating capillary tube according to the present invention includes: a capillary tube body of a straight tube shape in which the outer shape of a transverse cross-section thereof is an elongate shape elongated in a width direction thereof and the thickness thereof is an approximately constant; and a sealing part sealing one end portion of the capillary tube body. The sealing part is formed so that the dimension thereof in the width direction gradually decreases toward a distal end thereof and the dimension thereof in a thickness direction perpendicular to the width direction gradually increases and then gradually decreases toward the distal end thereof. Thus, fluorescence from the encapsulated phosphor is less likely to leak from an end of the capillary tube so that the efficiency of light extraction from the tube wall of the capillary tube can be increased. Therefore, by using the second phosphor-encapsulating capillary tube according to the present invention, a high-intensity edge-lit backlight can be achieved.

In the second phosphor-encapsulating capillary tube according to the present invention, the maximum dimension of the sealing part in the thickness direction is preferably 1.1 to 3.0 times the dimension of the capillary tube body along the thickness direction.

A third phosphor-encapsulating capillary tube according to the present invention is a phosphor-encapsulating capillary tube which is sealed at one end portion thereof and open at the other end portion thereof and into which a phosphor is to be encapsulated through the other end portion thereof. The third phosphor-encapsulating capillary tube according to the present invention includes: a capillary tube body of a straight tube shape in which the outer shape of a transverse cross-section thereof is an elongate shape elongated in a width direction thereof and the thickness thereof is an approximately constant; and a sealing part sealing one end portion of the capillary tube body. The sealing part is formed so that each of the dimension thereof in the width direction and the dimension thereof in a thickness direction perpendicular to the width direction gradually decreases toward a distal end thereof. Thus, fluorescence from the encapsulated phosphor is less likely to leak from an end of the capillary tube so that the efficiency of light extraction from the tube wall of the capillary tube can be increased. Therefore, by using the third phosphor-encapsulating capillary tube according to the present invention, a high-intensity edge-lit backlight can be achieved.

In each of the second and third phosphor-encapsulating capillary tubes according to the present invention, it is preferred that the sealing part have a side wall portion and a bottom wall portion which define a recess opening into a through hole in the capillary tube body and at least a region of the bottom wall portion be formed with a flat surface having a normal direction parallel to a central axis of the capillary tube body.

In each of the second and third phosphor-encapsulating capillary tubes according to the present invention, a central region of the bottom wall portion is preferably formed so that the normal direction thereof is oriented to the central axis of the capillary tube body.

In each of the second and third phosphor-encapsulating capillary tubes according to the present invention, the bottom wall portion is preferably located closer to the center of the capillary tube in a direction of extension of the central axis of the capillary tube body than a portion of the sealing part having the maximum dimension in the thickness direction.

In each of the second and third phosphor-encapsulating capillary tubes according to the present invention, the capillary tube body is preferably formed in a rectangular tube shape.

A first wavelength-converting member according to the present invention includes: a capillary tube sealed at both end portions; and a phosphor encapsulated in the capillary tube. The capillary tube includes: a capillary tube body of a straight tube shape in which the outer shape of a transverse cross-section thereof is an elongate shape elongated in a width direction thereof and the thickness thereof is an approximately constant; a first sealing part sealing one end portion of the capillary tube body; and a second sealing part sealing the other end portion of the capillary tube body. At least one of the first and second sealing parts is formed so that the dimension thereof in the width direction gradually decreases toward a distal end thereof and the dimension thereof in a thickness direction perpendicular to the width direction gradually increases and then gradually decreases toward the distal end thereof. Thus, fluorescence from the phosphor is less likely to leak from an end of the capillary tube so that the efficiency of light extraction from the tube wall of the capillary tube can be increased. Therefore, by using the first wavelength-converting member according to the present invention, a high-intensity edge-lit backlight can be achieved.

A second wavelength-converting member according to the present invention includes: a capillary tube sealed at both end portions; and a phosphor encapsulated in the capillary tube. The capillary tube includes: a capillary tube body of a straight tube shape in which the outer shape of a transverse cross-section thereof is an elongate shape elongated in a width direction thereof and the thickness thereof is an approximately constant; a first sealing part sealing one end portion of the capillary tube body; and a second sealing part sealing the other end portion of the capillary tube body. At least one of the first and second sealing parts is formed so that each of the dimension thereof in the width direction and the dimension thereof in a thickness direction perpendicular to the width direction gradually decreases toward a distal end thereof. Thus, fluorescence from the phosphor is less likely to leak from an end of the capillary tube so that the efficiency of light extraction from the tube wall of the capillary tube can be increased. Therefore, by using the second wavelength-converting member according to the present invention, a high-intensity edge-lit backlight can be achieved.

A method for producing a wavelength-converting member according to the present invention includes: the step of injecting the phosphor into any one of the first to third phosphor-encapsulating capillary tubes through the other end portion; and a first end portion sealing step of sealing the other end portion of the phosphor-encapsulating capillary tube in which the phosphor has been injected.

Advantageous Effects of Invention

The present invention can provide a method for producing a phosphor-encapsulating capillary tube in which, when a phosphor is encapsulated thereinto, fluorescence from the phosphor is less likely to leak from an end of the capillary tube; and such a phosphor-encapsulating capillary tube.

DESCRIPTION OF EMBODIMENTS

Hereinafter, a description will be given of exemplary preferred embodiments for working of the present invention. However, the following embodiments are simply illustrative and the present invention is not at all limited to the following embodiments.

<<First Embodiment>>

Figure 1:
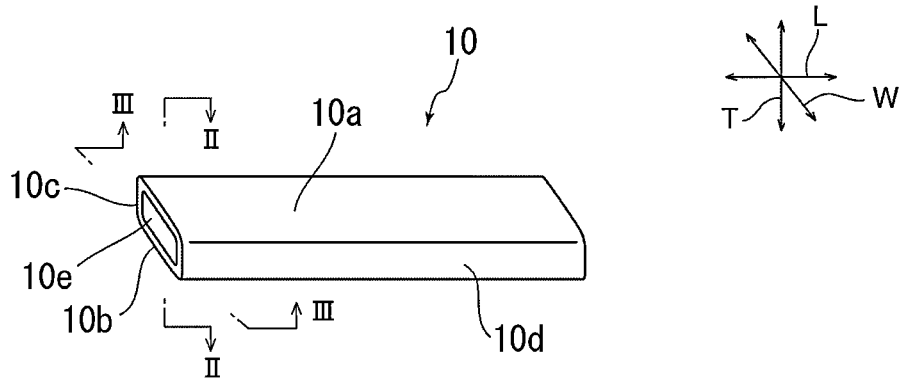
FIG. 1 is a schematic perspective view of a glass capillary tube in a first embodiment.
Figure 2:
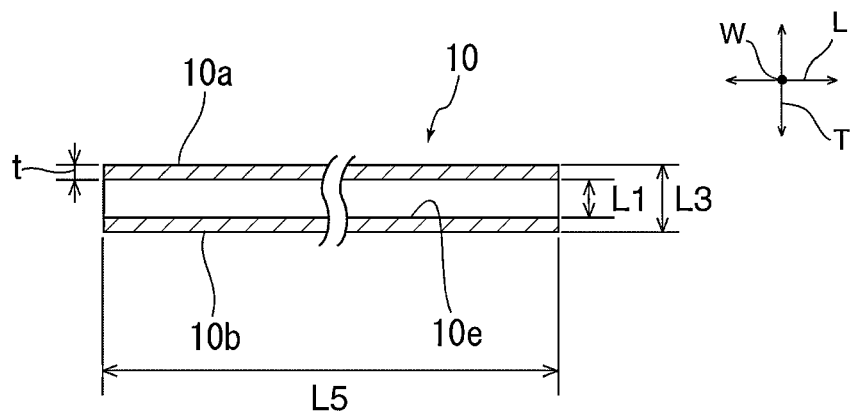
FIG. 2 is a schematic cross-sectional view taken along the line II-II of FIG. 1.
Figure 3:
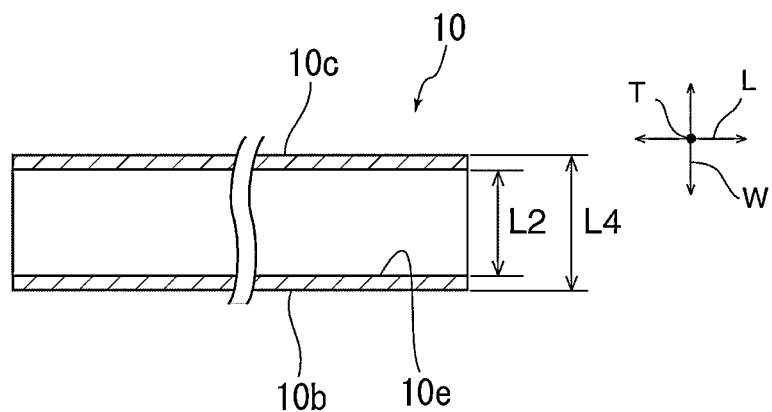
FIG. 3 is a schematic cross-sectional view taken along the line III-III of FIG. 1.

FIG. 1 is a schematic perspective view of a glass capillary tube. FIG. 2 is a schematic cross-sectional view taken along the line II-II of FIG. 1. FIG. 3 is a schematic cross-sectional view taken along the line III-III of FIG. 1.

First prepared is a glass capillary tube 10 shown in FIGS. 1 to 3. In the glass capillary tube 10, the outer shape of the transverse cross-section (the cross-section along the width direction W and the thickness direction T thereof) is an elongate shape elongated in the width direction W. Specifically, in this embodiment, the glass capillary tube 10 is formed in a rectangular tube shape. The term "rectangular tube" used herein refers to a straight tube each of the outer shape and inner shape of which is a rectangular shape as viewed from the length direction L. The term "rectangular shape" includes a rectangular shape the corners of which are chamfered or rounded.

The glass capillary tube 10 has first and second flat-plate-like side walls 10a, 10b opposed to each other and third and fourth flat-plate-like side walls 10c, 10d opposed to each other. These first to fourth side walls 10a to 10d define a rectangular cylindrical through hole 10e.

No particular limitation is placed on the dimensions of the glass capillary tube 10. The thickness t (see FIG. 2) of the glass capillary tube 10 can be, for example, about 0.01 mm to about 1.0 mm. The inside diameter L1 of the glass capillary tube 10 along the thickness direction T can be, for example, about 0.05 mm to about 1.0 mm. The outside diameter L3 of the glass capillary tube 10 along the thickness direction T can be, for example, about 0.07 mm to about 3.0 mm. The inside diameter L2 of the glass capillary tube 10 along the width direction W can be, for example, about 0.1 mm to about 2.0 mm. The outside diameter L4 of the glass capillary tube 10 along the width direction W can be, for example, about 0.12 mm to about 4.0 mm. The ratios L1/L2 and L3/L4 can be, for example, about 0.025 to about 0.5. The ratio t/L1 can be, for example, about 0.01 to about 2.0. The ratio t/L2 can be, for example, about 0.005 to about 2.0. The dimension L5 of the glass capillary tube 10 along the length direction L can be, for example, about 10 mm to about 100 mm.

No particular limitation is placed on the type of glass forming the glass capillary tube 10. The glass capillary tube 10 may be made of, for example, silicate glass, borate glass, phosphate glass, borosilicate glass, or borophosphate glass. Particularly, the glass capillary tube 10 is preferably made of silicate glass or borosilicate glass from the viewpoint of increasing the rigidity of a phosphor-encapsulating capillary tube to be produced.

No particular limitation is also placed on the softening temperature (At) of the glass capillary tube 10. The softening temperature (At) of the glass capillary tube 10 can be, for example, about 700° C. to about 950° C.

Figure 4:
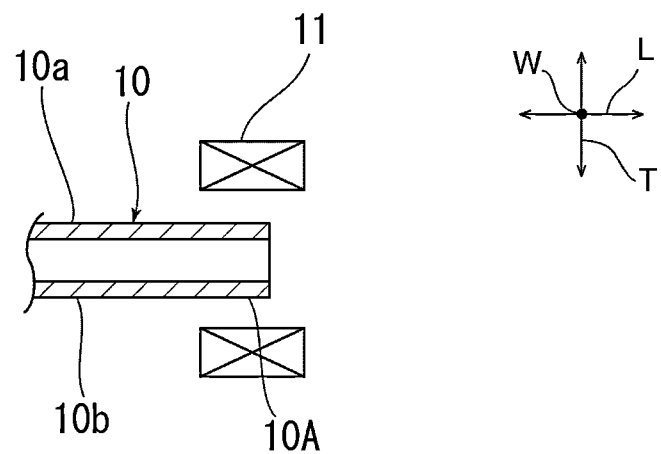
FIG. 4 is a schematic cross-sectional view for illustrating a heating step in the first embodiment.

Next, as shown in FIG. 4, one end portion 10A of the glass capillary tube 10 is heated using a heating means 11. No particular limitation is placed on the type of the heating means 11 so long as it can suitably heat the glass capillary tube 10. Examples of the heating means 11 that can be suitably used include an infrared laser radiation device, a gas burner, and an electric heater.

Figure 5:
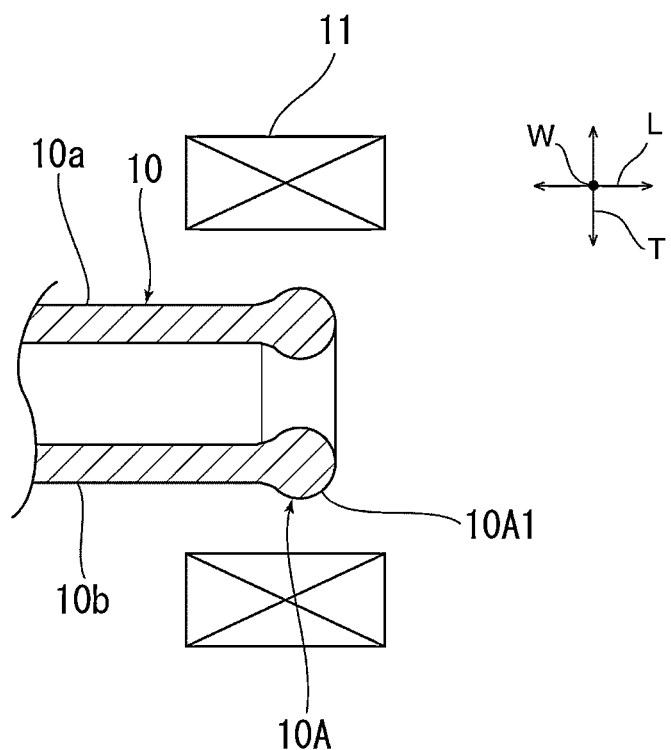
FIG. 5 is a schematic cross-sectional view for illustrating the heating step in the first embodiment.

When the heating of the end portion 10A progresses, the end portion 10A starts melting as shown in FIG. 5. When the end portion 10A melts, the cross section of the end portion 10A becomes circular by the surface tension of the glass melt.

Figure 6:
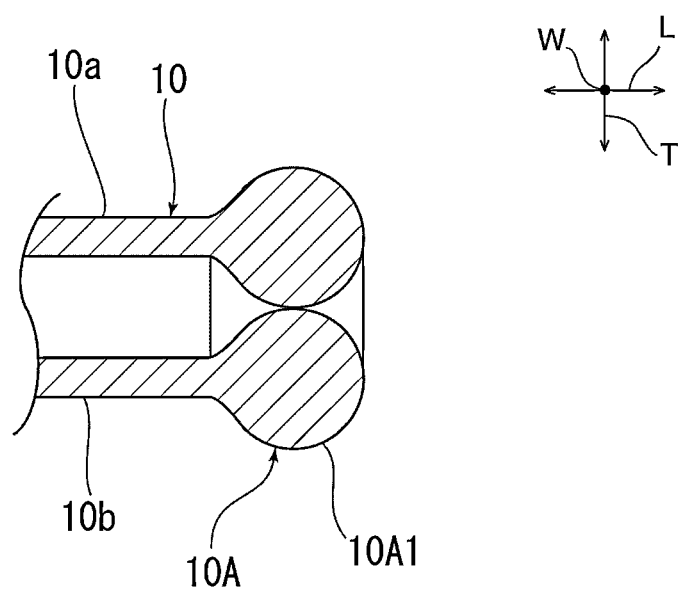
FIG. 6 is a schematic cross-sectional view for illustrating the heating step in the first embodiment.

With further progress of heating of the end portion 10A, the melting of the end portion 10A further progresses so that the thickness of a circular cross-sectional portion 10A1 formed at the end portion 10A grows larger. Then, as shown in FIG. 6, a section of the circular cross-sectional portion 10A1 formed of the first side wall 10a comes into contact with a section of the circular cross-sectional portion 10A1 formed of the second side wall 10b. Thus, by the surface tension of the glass melt, the section formed of the first side wall 10a is integrated with the section formed of the second side wall 10b.

Figure 7:
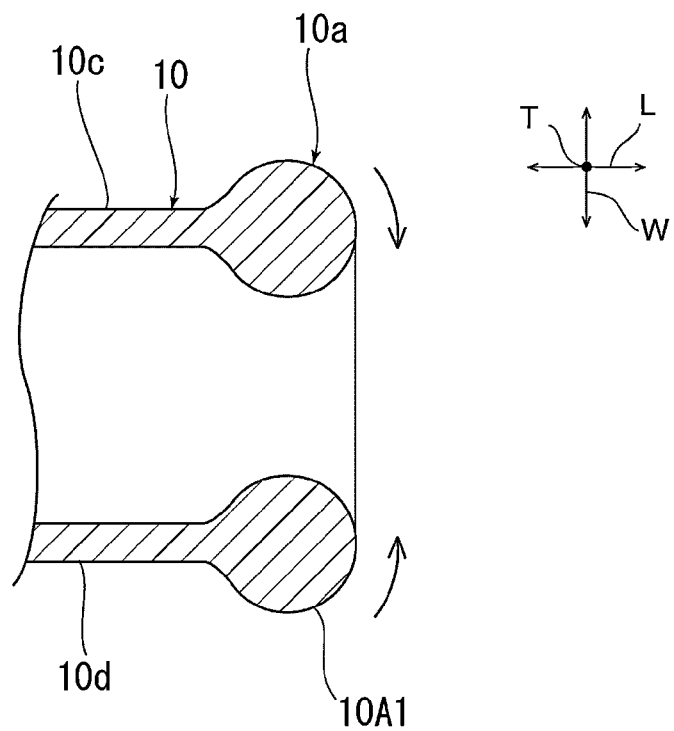
FIG. 7 is a schematic cross-sectional view for illustrating the heating step in the first embodiment.

Here, in this embodiment, the distance between the third and fourth side walls 10c, 10d is longer than the distance between the first and second side walls 10a, 10b. Therefore, as shown in FIG. 7, when the section of the circular cross-sectional portion 10A1 formed of the first side wall 10a comes into contact with the section of the circular cross-sectional portion 10A1 formed of the second side wall 10b, a section of the circular cross-sectional portion 10A1 formed of the third side wall 10c does not come into contact with a section of the circular cross-sectional portion 10A1 formed of the fourth side wall 10d. Yet, when the section formed of the first side wall 10a starts being integrated with the section formed of the second side wall 10b, this accompanies the movement of the section of the circular cross-sectional portion 10A1 formed of the third side wall 10c and the section of the circular cross-sectional portion 10A1 formed of the fourth side wall 10d toward each other and then the integration thereof with the other sections. As a result, the end portion 10A is sealed. The heating of the end portion 10A is performed until the end portion 10A has been fully sealed. Then, by cooling the end portion 10A, a phosphor-encapsulating capillary tube 20 shown in FIGS. 8 and 9 is completed.

Whereas one end portion of the phosphor-encapsulating capillary tube 20 is open, the other end portion thereof is sealed. A phosphor is injected into the phosphor-encapsulating capillary tube 20 through the open end portion. Thereafter, the open end portion is also sealed in the same manner as described above. This results in the completion of a linear wavelength-converting member formed of a glass capillary tube in which a phosphor is encapsulated.

Figure 8:
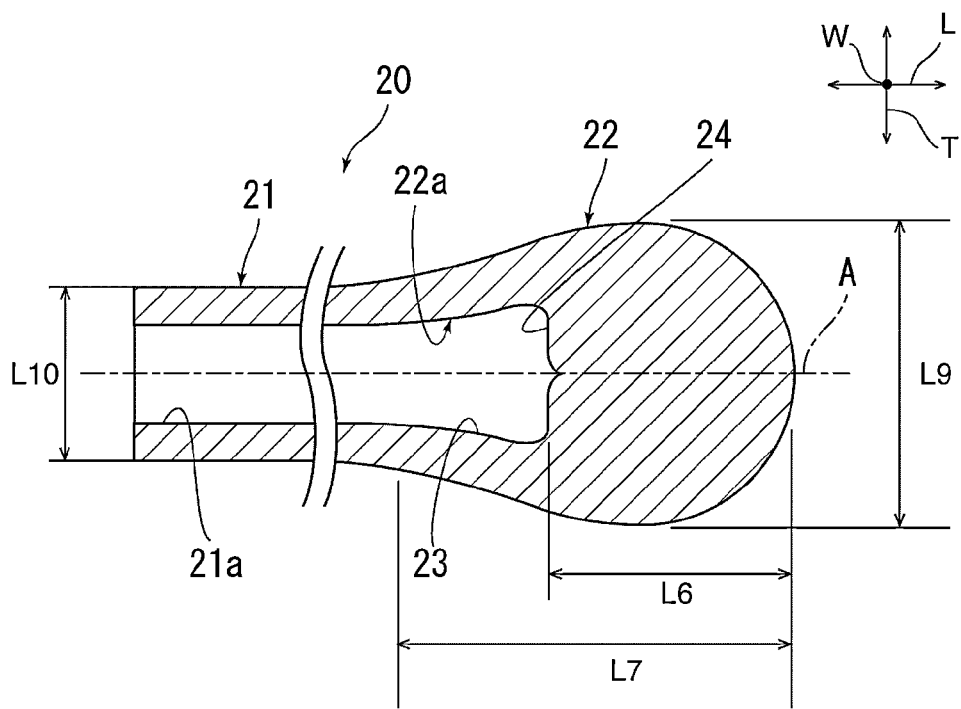
FIG. 8 is a schematic cross-sectional view of a phosphor-encapsulating capillary tube in the first embodiment.
Figure 9:
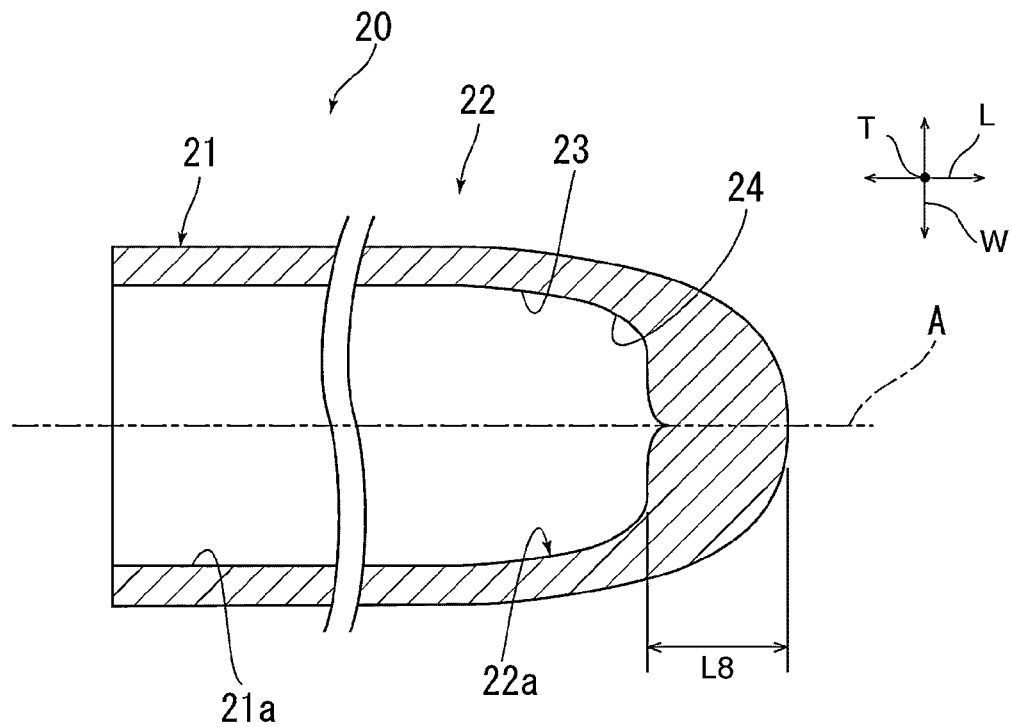
FIG. 9 is a schematic cross-sectional view of the phosphor-encapsulating capillary tube in the first embodiment.

Next, a description is given of the structure of the phosphor-encapsulating capillary tube 20 produced in this embodiment with reference to FIGS. 8 and 9.

The phosphor-encapsulating capillary tube 20 includes a capillary tube body 21 and a sealing part 22. The capillary tube body 21 is constituted by an unmelted portion of the glass capillary tube 10. In the capillary tube body 21, the outer diameter of the transverse cross-section is an elongate shape elongated in the width direction W. Specifically, the capillary tube body 21 is a rectangular straight tube. The thickness of the capillary tube body 21 is approximately constant.

The sealing part 22 is a portion of the glass capillary tube 10 formed of the melted end portion 10A. The sealing part 22 seals one end portion of the capillary tube body 21. The sealing part 22 is formed so that the dimension (outside diameter) thereof in the width direction W gradually decreases toward the distal end as shown in FIG. 9 and the dimension (outside diameter) thereof in the thickness direction T perpendicular to the width direction W gradually increases and then gradually decreases toward the distal end as shown in FIG. 8. In this embodiment, the maximum dimension L9 (see FIG. 8) of the sealing part 22 in the thickness direction T is preferably 1.1 to 3.0 times the dimension L10 (=L3) of the capillary tube body 21 along the thickness direction T. Specifically, L9 is preferably about 0.08 mm to about 9 mm.

The sealing part 22 has a side wall portion 23 and a bottom wall portion 24 which define a recess 22a opening into a through hole 21a in the capillary tube body 21. The side wall portion 23 gradually widens toward the distal end as viewed from the width direction W as shown in FIG. 8, while mutually opposed regions of the bottom wall portion 24 gradually narrow the distance therebetween toward the distal end as viewed from the thickness direction T as shown in FIG. 9.

At least a region of the bottom wall portion 24 is formed with a flat surface having a normal direction parallel to the central axis A of the capillary tube body 21. Specifically, in this embodiment, the remaining region of the bottom wall portion 24 except for a central region thereof and a connecting region thereof with the side wall portion 23 is formed with a flat surface having a normal direction parallel to the central axis A of the capillary tube body 21. The central region of the bottom wall portion 24 is formed so that the normal direction thereof is oriented to the central axis A. In other words, the central region is formed to gradually narrow toward the distal end as viewed from each of the width direction W and the thickness direction T.

The bottom wall portion 24 is located closer to the center in the direction of extension of the central axis A (i.e., the length direction L) than a portion of the sealing part 22 having the maximum dimension in the thickness direction T.

The distance L6 from the bottom wall portion 24 to the distal end of the sealing part 22 is preferably within the range of 0.2 to 0.8 times the length L7 of the sealing part 22. Specifically, L6 is preferably about 0.1 mm to about 4.0 mm. L7 is preferably about 0.13 mm to about 10 mm. L8 (see FIG. 9) is preferably about 0.1 mm to about 4.0 mm.

In the method for producing a phosphor-encapsulating capillary tube of this embodiment, the inside wall of the sealing part 22 of the phosphor-encapsulating capillary tube 20 is substantially non-parallel to the outside wall thereof as can be seen from the above. Therefore, light from the phosphor encapsulated in the phosphor-encapsulating capillary tube 20 becomes likely to be reflected on either the inside wall or the outside wall of the sealing part 22. Thus, fluorescence becomes less likely to leak from the sealing part 22 and the rate of fluorescence output from the capillary tube body 21 is increased. Hence, by forming an edge-lit backlight using the phosphor-encapsulating capillary tube 20 produced in this embodiment, a high-intensity backlight can be achieved. Note that by injecting a phosphor into the phosphor-encapsulating capillary tube 20 through the open end portion and then sealing the open end portion in the same manner as described previously, the above effects can be more significantly obtained.

In contrast, if, as described in Patent Literature 2, a midway portion of a glass capillary tube is heated and melted and both ends of the glass capillary tube are pulled in directions away from each other to thereby seal the end portion of the glass capillary tube, the thickness of the sealing part becomes approximately constant. Therefore, the inside wall and outside wall of the sealing part become approximately parallel to each other. Thus, light from the encapsulated phosphor will be likely to leak from the sealing part. Hence, the rate of fluorescence output from the capillary tube body will be decreased.

Figure 10:
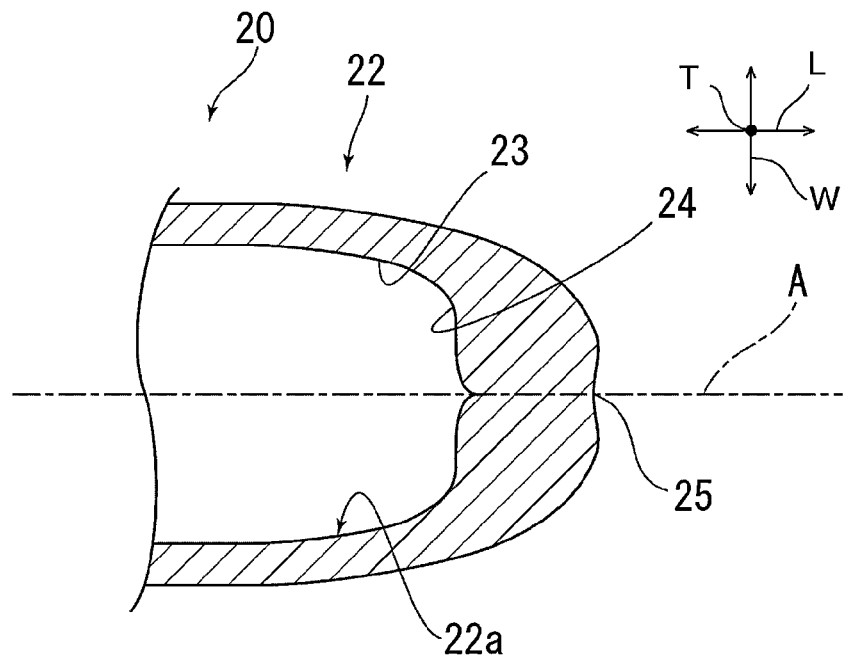
FIG. 10 is a schematic cross-sectional view of a phosphor-encapsulating capillary tube according to a modification of the first embodiment.

The above embodiment has described an example in which the end portion 10A is sufficiently heated until the distal end of the sealing part 22 projects in the length direction L. However, the present invention is not limited to this. For example, by shortening the heating time or lowering the heating temperature, an indent 25 may be formed at the distal end of the sealing part 22 as shown in FIG. 10.

Next, a description is given of a method for producing a wavelength-converting member using the phosphor-encapsulating capillary tube 20 produced in this embodiment.

First, a phosphor is injected into the phosphor-encapsulating capillary tube 20 through the opening. No particular limitation is placed on the method for injecting the phosphor. However, if the phosphor is in liquid form or is formed of fine phosphor particles dispersed in a liquid, it is preferred to use, for example, a method of supplying a phosphor into the phosphor-encapsulating capillary tube 20 with the phosphor-encapsulating capillary tube 20 under reduced pressure.

Next, the opening of the phosphor-encapsulating capillary tube 20 is sealed by substantially the same method as the sealing method done in producing the phosphor-encapsulating capillary tube 20. Thus, a wavelength-converting member can be completed in which the phosphor is encapsulated in the capillary tube sealed at both end portions.

Each of both end portions of the capillary tube of the wavelength-converting member according to this embodiment has a structure shown in FIGS. 8 and 9. Specifically, in the capillary tube of the wavelength-converting member, the outer shape of the transverse cross-section is an elongate shape elongated in the width direction. The capillary tube includes: a capillary tube body of a straight tube shape having an approximately constant thickness; a first sealing part sealing one end portion of the capillary tube body; and a second sealing part sealing the other end portion of the capillary tube body. Each of the first and second sealing parts is formed so that the dimension thereof in the width direction gradually decreases toward the distal end and the dimension thereof in the thickness direction perpendicular to the width direction gradually increases and then gradually decreases toward the distal end. Thus, fluorescence from the phosphor is less likely to leak from the ends of the capillary tube so that the efficiency of light extraction from the tube wall of the capillary tube can be increased. Therefore, by using the wavelength-converting member according to this embodiment, a high-intensity edge-lit backlight can be achieved.

The present invention will be described below in further detail with reference to specific examples. However, the present invention is not at all limited to the following examples and modifications and variations may be appropriately made therein without changing the gist of the invention.

EXAMPLE

Figure 11:
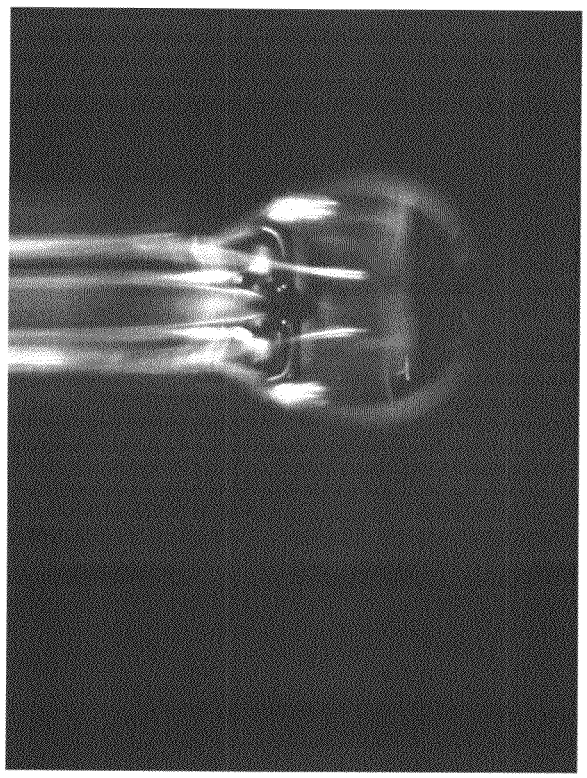
FIG. 11 is a top photograph of a phosphor-encapsulating capillary tube produced in an example.
Figure 12:
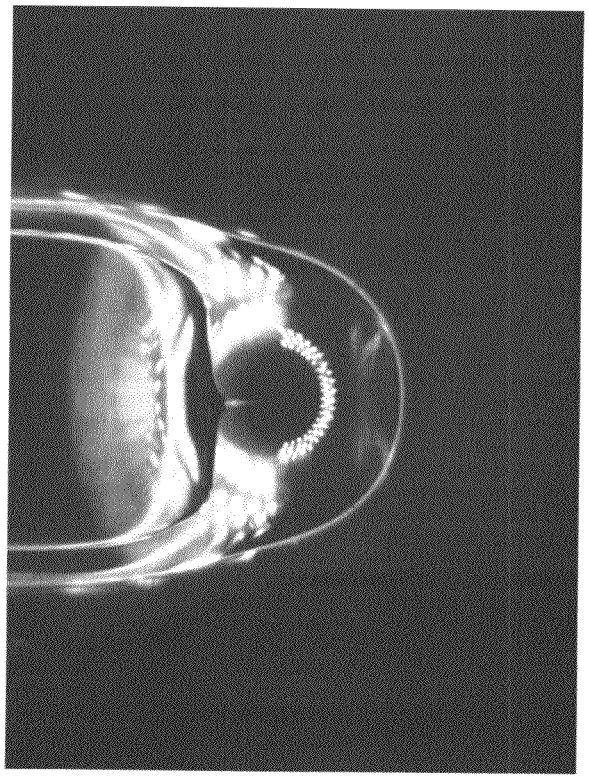
FIG. 12 is a lateral photograph of the phosphor-encapsulating capillary tube produced in the example.

First, by a drawing method, a glass capillary tube 10 was formed in which L3 was 0.2 mm, L4 was 0.6 mm, L1 was 0.1 mm, L2 was 0.5 mm, and the thickness t was 0.05 mm. Next, an end portion of the glass capillary tube 10 was heated using an infrared laser until the end portion was melted, integrated, and thus sealed, resulting in the production of a phosphor-encapsulating capillary tube 20. A top photograph and a lateral photograph of the produced phosphor-encapsulating capillary tube 20 are shown in FIGS. 11 and 12, respectively.

Comparative Example

A glass flat plate made of glass having the same composition as the glass capillary tube 10 produced in the above Example was fusion-bonded to the glass capillary tube 10 produced in the above Example to produce a phosphor-encapsulating capillary tube the end portion of which had a flat-plate shape.

A phosphor was encapsulated in each of the phosphor-encapsulating capillary tubes produced in the above Example and Comparative Example in the same manner and then measured in terms of intensity of fluorescence leaking from the end portion of the phosphor-encapsulating capillary tube upon radiation of a blue light to the side surface of the phosphor-encapsulating capillary tube using an LED. As a result, the average brightness of fluorescence having leaked from the end portion of the phosphor-encapsulating capillary tube produced in Example was approximately 0.34 times that of fluorescence having leaked from the end portion of the phosphor-encapsulating capillary tube produced in Comparative Example. It can be seen from this result that Example makes it difficult to leak fluorescence from the sealing part.

Hereinafter, a description will be given of another exemplary preferred embodiment for working of the present invention. In the following description, elements having substantially the same functions as those in the first embodiment are referred to by the common reference numerals and further explanation thereof will be omitted.

<<Second Embodiment>>

(Method for Producing Phosphor-Encapsulating Capillary Tube)

First described is a method for producing a phosphor-encapsulating capillary tube in this embodiment. The phosphor-encapsulating capillary tube described in this case is a phosphor-encapsulating capillary tube which is open at a first end portion thereof located on a first side thereof in the length direction and is sealed at a second end portion thereof located on a second side thereof in the length direction and into which a phosphor is to be encapsulated through the first end portion.

(Preparation of Glass Capillary Tube 10)

Figure 13:
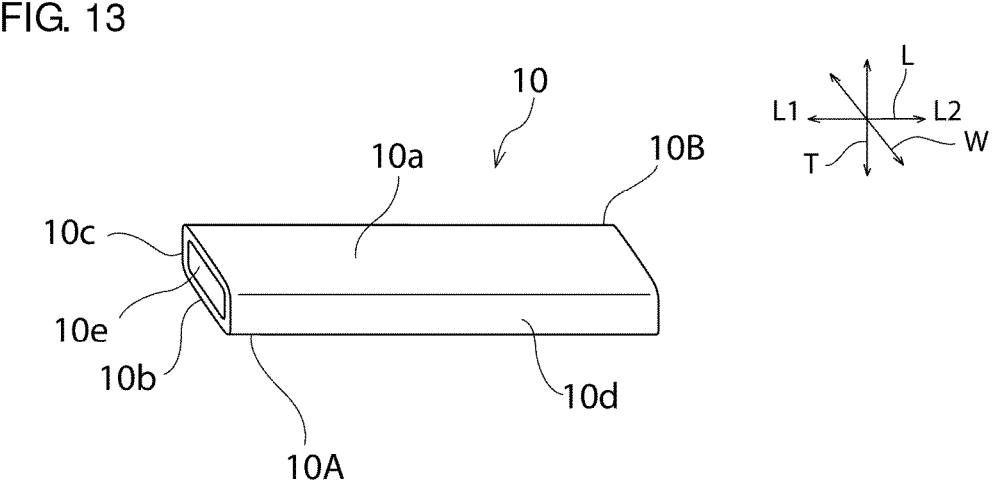
FIG. 13 is a schematic perspective view of a glass capillary tube in a second embodiment.
Figure 14:
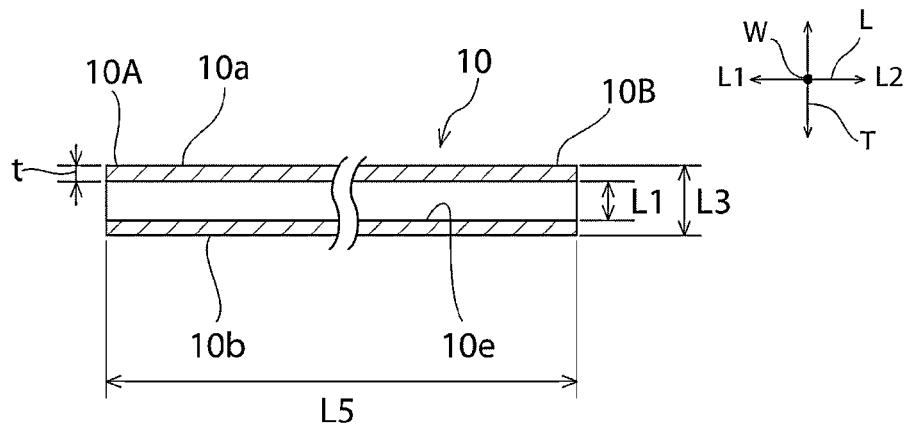
FIG. 14 is a schematic cross-sectional view taken along the line II-II of FIG. 1.
Figure 15:
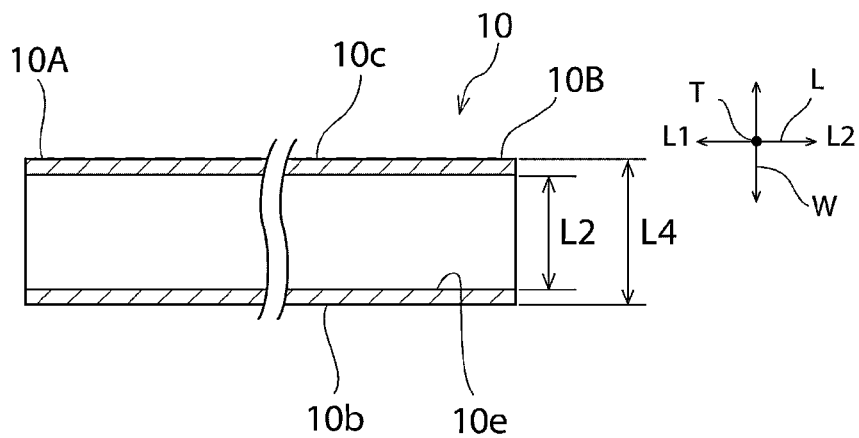
FIG. 15 is a schematic cross-sectional view taken along the line III-III of FIG. 1.

First prepared is a glass capillary tube 10 shown in FIGS. 13 to 15 in which the first and second end portions 10A, 10B are open. In the glass capillary tube 10, the outer shape of the transverse cross-section (the cross-section along the width direction W and the thickness direction T thereof) is an elongate shape elongated in the width direction W. Specifically, in this embodiment, the glass capillary tube 10 is formed in a rectangular tube shape in which the outer shape of the transverse cross-section is rectangular. The term "rectangular tube" used herein refers to a straight tube each of the outer shape and inner shape of which is a rectangular shape as viewed from the length direction L. The term "rectangular shape" includes a rectangular shape the corners of which are chamfered or rounded.

The glass capillary tube 10 has first and second flat-plate-like side walls 10a, 10b opposed to each other and third and fourth flat-plate-like side walls 10c, 10d opposed to each other. These first to fourth side walls 10a to 10d define a rectangular cylindrical through hole 10e.

No particular limitation is placed on the dimensions of the glass capillary tube 10. The thickness t (see FIG. 14) of the glass capillary tube 10 can be, for example, about 0.01 mm to about 1.0 mm. The inside diameter L1 of the glass capillary tube 10 along the thickness direction T can be, for example, about 0.05 mm to about 1.0 mm. The outside diameter L3 of the glass capillary tube 10 along the thickness direction T can be, for example, about 0.07 mm to about 3.0 mm. The inside diameter L2 of the glass capillary tube 10 along the width direction W can be, for example, about 0.1 mm to about 2.0 mm. The outside diameter L4 of the glass capillary tube 10 along the width direction W can be, for example, about 0.12 mm to about 4.0 mm. The ratios L1/L2 and L3/L4 can be, for example, about 0.025 to about 0.5. The ratio t/L1 can be, for example, about 0.01 to about 2.0. The ratio t/L2 can be, for example, about 0.005 to about 2.0. The dimension L5 of the glass capillary tube 10 along the length direction L can be, for example, about 10 mm to about 100 mm.

No particular limitation is placed on the type of glass forming the glass capillary tube 10. The glass capillary tube 10 may be made of, for example, silicate glass, borate glass, phosphate glass, borosilicate glass, or borophosphate glass. Particularly, the glass capillary tube 10 is preferably made of silicate glass or borosilicate glass from the viewpoint of increasing the rigidity of a phosphor-encapsulating capillary tube to be produced.

No particular limitation is also placed on the softening temperature (At) of the glass capillary tube 10. The softening temperature (At) of the glass capillary tube 10 can be, for example, about 700° C. to about 950° C.

(Sealing of Second End Portion 10B of Glass Capillary Tube 10)

Next, a description is given of the step of sealing the second end portion 10B of the glass capillary tube 10 with reference to FIGS. 16 to 19.

This sealing step (heating step) includes a first heating step and a second heating step.

Figure 16:
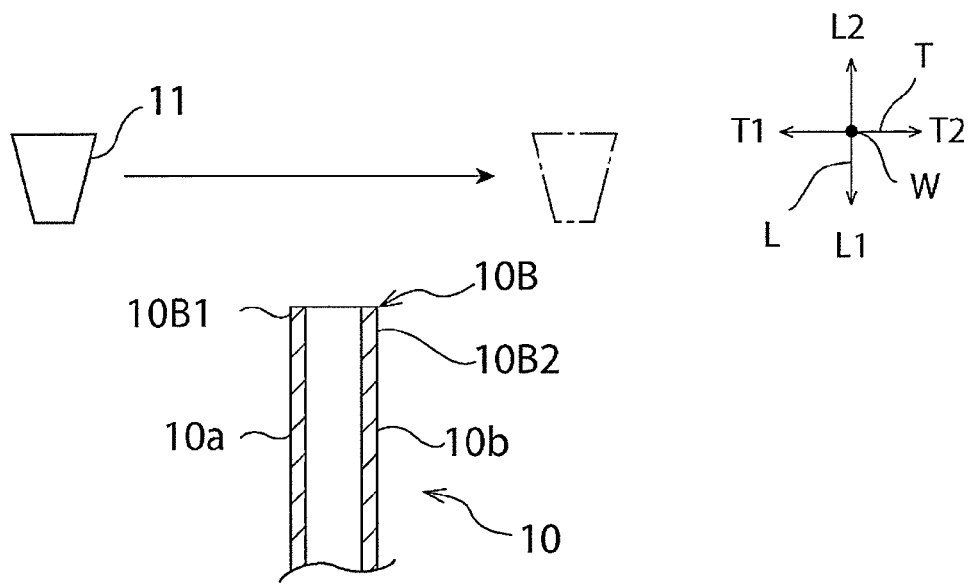
FIG. 16 is a schematic side view for illustrating the step of sealing a second end portion of a glass capillary tube in the second embodiment.

First, the first heating step is performed. Specifically, as shown in FIG. 16, a heating means 11 is allowed to move above and across an L2 side of the second end portion 10B in the length direction L. More specifically, in this embodiment, the heating means 11 is allowed to move above and across the second end portion 10B from T1 side to T2 side of the thickness direction T. Thus, the second end portion 10B is heated and thus softened. Then, the second end portion 10B is sealed.

Figure 18:
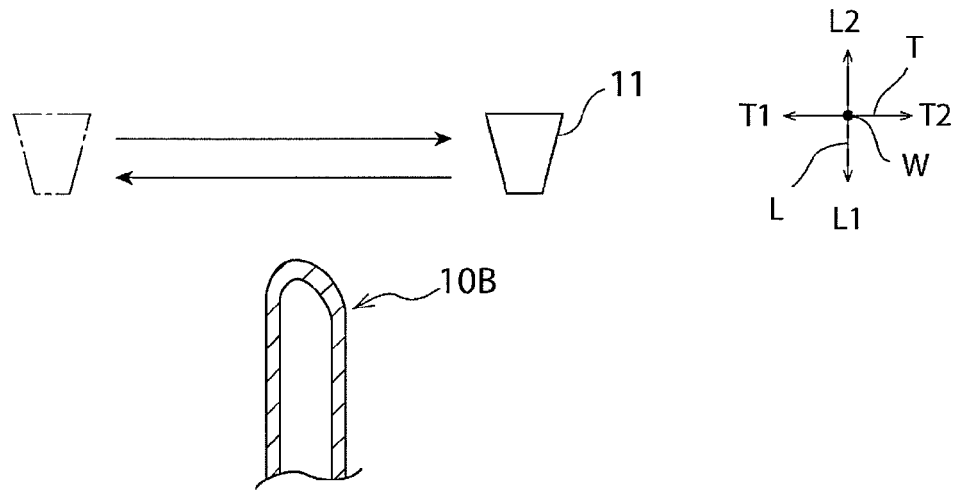
FIG. 18 is a schematic side view for illustrating the step of sealing the second end portion of the glass capillary tube in the second embodiment.
Figure 19:
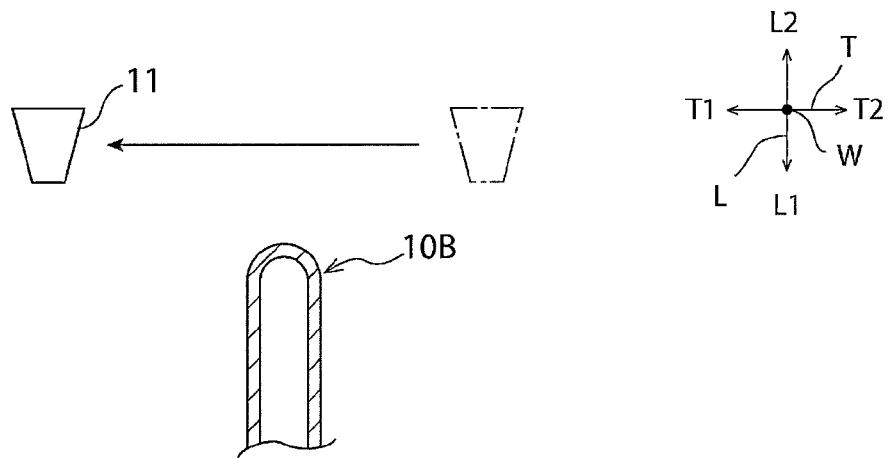
FIG. 19 is a schematic side view for illustrating the step of sealing the second end portion of the glass capillary tube in the second embodiment.

Next, the second heating step is performed. Specifically, as shown in FIG. 18, the heating means 11 is allowed to move above and across the L2 side of the second end portion 10B in the length direction L and reversely to the first heating step. In other words, the heating means 11 is allowed to move above and across the second end portion 10B from T2 side to T1 side of the thickness direction T. Thus, as shown in FIG. 19, the sealed second end portion 10B is heated again to get it into shape.

Note that although this embodiment describes an example in which in the first and second heating steps the heating means 11 is moved in the thickness direction T, the direction of movement of the heating means in the present invention is not limited to the thickness direction. The heating means may be moved in the width direction or moved in any direction inclined to the width direction and thickness direction.

Furthermore, this embodiment describes an example in which the first and second heating steps are performed once for each step. However, the present invention is not limited to this. The first and second heating steps may be repeated a plurality of times.

No particular limitation is placed on the type of the heating means 11 so long as it can heat the glass capillary tube 10. The heating means 11 can be constituted, for example, by a laser radiation device or a burner. Hereinafter, this embodiment describes an example in which a laser radiation device is used as the heating means 11.

Figure 17:
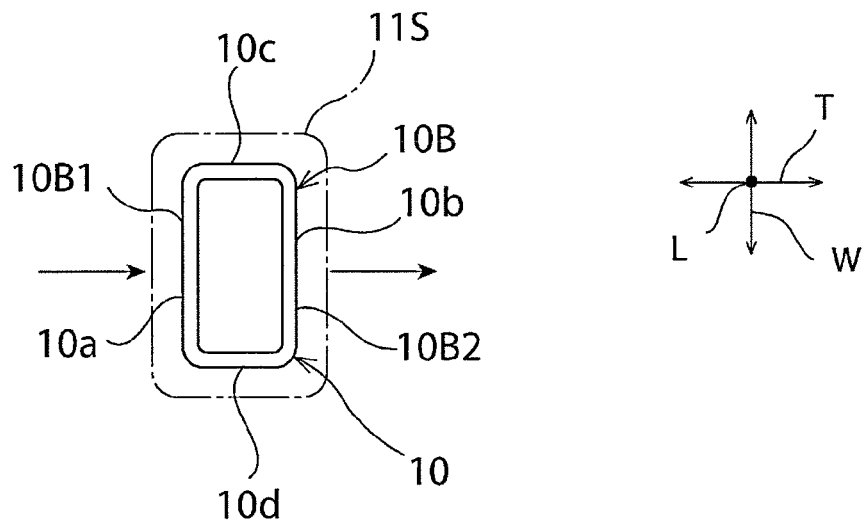
FIG. 17 is a schematic plan view for illustrating the shape of a spot diameter of a laser in the second embodiment.

More specifically, in the laser radiation device used as the heating means 11 in this embodiment, as shown in FIG. 17, the shape of a spot 11S of a laser light is an elongate shape elongated in the width direction W of the glass capillary tube 10. For this reason, in the first and second heating steps, the time for radiation of the laser light to the second end portion 10B is constant in the width direction W perpendicular to the thickness direction T which is the direction of movement of the heating means 11. In other words, one end region, the middle region, and the other end region of the second end portion 10B are irradiated with a laser light over substantially the same period of time in each of the first and second heating steps.

Note that the heating temperature and moving speed of the heating means 11 in the first and second heating steps are set at values to avoid that the second end portion 10B becomes larger in size than the remaining portion of the glass capillary tube 10.

Specifically, the output of the laser light is controlled to be about 5 W to about 30 W and the moving speed is controlled to be 1 to 50 mm/min.

(Phosphor-Encapsulating Capillary Tube 20)

Figure 20:
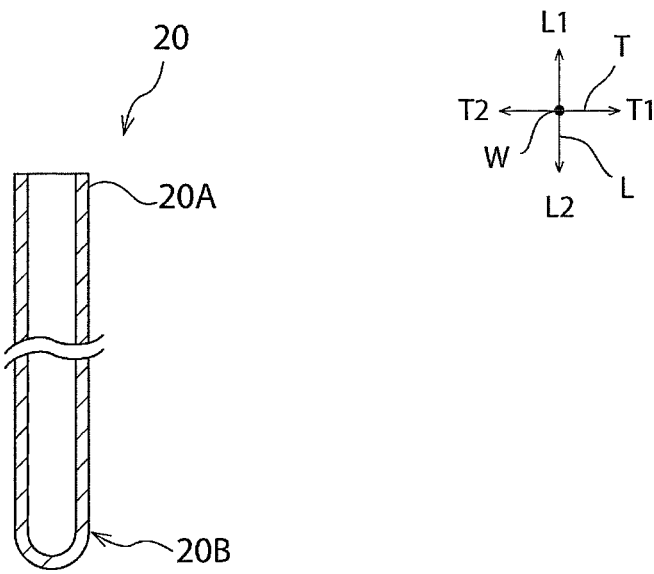
FIG. 20 is a schematic cross-sectional view of a phosphor-encapsulating capillary tube in the second embodiment.

By performing the step of sealing the second end portion 10B, a phosphor-encapsulating capillary tube 20 shown in FIG. 20 can be produced (preparation step).

A first end portion 20A of the phosphor-encapsulating capillary tube 20 located on an L1 side thereof in the length direction L is open. This first end portion 20A is formed of the first end portion 10A. On the other hand, a second end portion 20B of the phosphor-encapsulating capillary tube 20 located on an L2 side thereof in the length direction L is sealed. This second end portion 20B is formed of the second end portion 10B. In the phosphor-encapsulating capillary tube 20, like the glass capillary tube 10, the outer shape of the transverse cross-section is an elongate shape elongated in the width direction W, more specifically, a rectangular shape.

(Injection of Phosphor)

Figure 21:
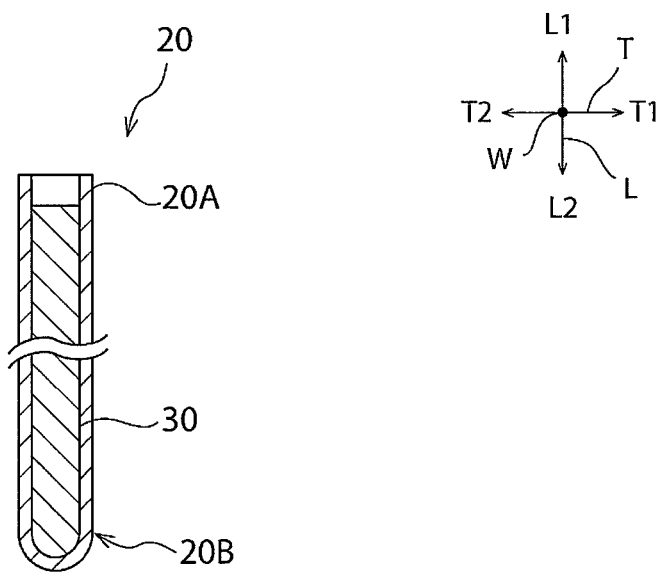
FIG. 21 is a schematic cross-sectional view for illustrating the step of injecting a phosphor into the phosphor-encapsulating capillary tube in the second embodiment.

Next, as shown in FIG. 21, a phosphor 30 is injected into the phosphor-encapsulating capillary tube 20. No particular limitation is placed on the method for injecting the phosphor 30. However, if the phosphor 30 is in liquid form or is formed of fine phosphor particles dispersed in a liquid, it is preferred to use, for example, a method of supplying a phosphor into the phosphor-encapsulating capillary tube 20 with the phosphor-encapsulating capillary tube 20 under reduced pressure.

No particular limitation is placed on the type of phosphor 30 injected in this step. The phosphor may be, for example, one containing an inorganic phosphor powder. Specific examples of the inorganic phosphor which produces a blue visible light (fluorescence having a wavelength of 440 nm to 480 nm) upon irradiation with an ultraviolet to near-ultraviolet excitation light having a wavelength of 300 nm to 440 nm include $Sr_5(PO_4)_3Cl:Eu^{2+}$ and $(Sr,Ba)MgAl_{10}O_{17}:Eu^{2+}$. Specific examples of the inorganic phosphor which produces a green visible light (fluorescence having a wavelength of 500 nm to 540 nm) upon irradiation with an ultraviolet to near-ultraviolet excitation light having a wavelength of 300 nm to 440 nm include $SrAl_2O_4:Eu^{2+}$ and $SrGa_2S_4:Eu^{2+}$. Specific examples of the inorganic phosphor which produces a green visible light (fluorescence having a wavelength of 500 nm to 540 nm) upon irradiation with a blue excitation light having a wavelength of 440 nm to 480 nm include $SrAl_2O_4: Eu^{2+}$ and $SrGa_2S_4: Eu^{2+}$. A specific example of the inorganic phosphor which produces a yellow visible light (fluorescence having a wavelength of 540 nm to 595 nm) upon irradiation with an ultraviolet to near-ultraviolet excitation light having a wavelength of 300 nm to 440 nm is $ZnS:Eu^{2+}$. A specific example of the inorganic phosphor which produces a yellow visible light (fluorescence having a wavelength of 540 nm to 595 nm) upon irradiation with a blue excitation light having a wavelength of 440 nm to 480 nm is $Y_3(Al,Gd)_5O_{12}:Ce^{2+}$. Specific examples of the inorganic phosphor which produces a red visible light (fluorescence having a wavelength of 600 nm to 700 nm) upon irradiation with an ultraviolet to near-ultraviolet excitation light having a wavelength of 300 nm to 440 nm include $Gd_3Ga_4O_{12}:Cr^{3+}$ and $CaGa_2S_4:Mn^{2+}$. Specific examples of the inorganic phosphor which produces a red visible light (fluorescence having a wavelength of 600 nm to 700 nm) upon irradiation with a blue excitation light having a wavelength of 440 nm to 480 nm include $Mg_2TiO_4:Mn^{4+}$ and $K_2SiF_6:Mn^{4+}$.

Alternatively, the inorganic phosphor powder may be a quantum dot, for example. The quantum dot emits, upon incidence of an excitation light, a light of different wavelength from the excitation light. The wavelength of light emitted from the quantum dot depends upon the particle size of the quantum dot. In other words, the wavelength of light obtained can be controlled by changing the particle size of the quantum dot. Therefore, the particle size of the quantum dot is selected to be a particle size meeting a desired wavelength of light. The quantum dot is generally likely to be degraded by the contact with oxygen.

Examples of the quantum dot that can be used include those having a particle size of about 2 nm to about 10 nm. Specific examples of the quantum dot which produces a blue visible light (fluorescence having a wavelength of 440 nm to 480 nm) upon irradiation with an ultraviolet to near-ultraviolet excitation light having a wavelength of 300 nm to 440 nm include CdSe nanocrystals having a particle size of about 2.0 nm to about 3.0 nm. Specific examples of the quantum dot which produces a green visible light (fluorescence having a wavelength of 500 nm to 540 nm) upon irradiation with an ultraviolet to near-ultraviolet excitation light having a wavelength of 300 nm to 440 nm or a blue light having a wavelength of 440 nm to 480 nm include CdSe nanocrystals having a particle size of about 3.0 nm to about 3.3 nm. Specific examples of the quantum dot which produces a yellow visible light (fluorescence having a wavelength of 540 nm to 595 nm) upon irradiation with an ultraviolet to near-ultraviolet excitation light having a wavelength of 300 nm to 440 nm or a blue light having a wavelength of 440 nm to 480 nm include CdSe nanocrystals having a particle size of about 3.3 nm to about 4.5 nm. Specific examples of the quantum dot which produces a red visible light (fluorescence having a wavelength of 600 nm to 700 nm) upon irradiation with an ultraviolet to near-ultraviolet excitation light having a wavelength of 300 nm to 440 nm or a blue light having a wavelength of 440 nm to 480 nm include CdSe nanocrystals having a particle size of about 4.5 nm to about 10 nm.

A single type or a plurality of types of phosphors 30 may be encapsulated in the phosphor-encapsulating capillary tube 20 depending upon the wavelength range of the excitation light and which color luminescence to be produced. For example, if a white light having superior color rendition is to be produced by irradiation with an ultraviolet to near-ultraviolet excitation light, respective phosphors 30 capable of producing blue, green, and red visible lights (fluorescences) by irradiation with the ultraviolet to near-ultraviolet excitation light can be used in combination. Alternatively, if a white light having superior color rendition is to be produced by irradiation with a blue excitation light, respective phosphors 30 capable of producing green and red visible lights (fluorescences) by irradiation with the blue excitation light can be used in combination.

(Sealing of First End Portion 20A of Phosphor-Encapsulating Capillary Tube 20)

Next performed is the step of sealing the first end portion 20A of the phosphor-encapsulating capillary tube 20 in which the phosphor 30 has been injected. This step is substantially the same step as the above step of sealing the second end portion 10B.

Specifically, the step of sealing the first end portion 20A includes a third heating step and a fourth heating step.

Figure 22:
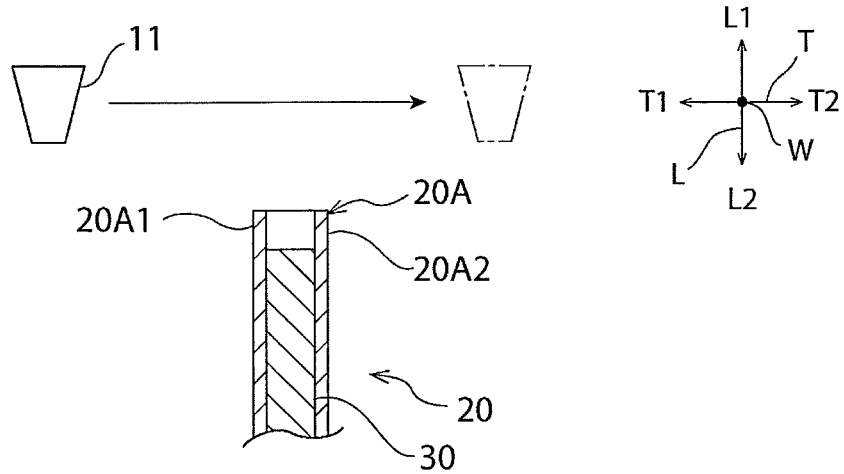
FIG. 22 is a schematic side view for illustrating the step of sealing a first end portion of the phosphor-encapsulating capillary tube in the second embodiment.

First, the third heating step is performed. Specifically, as shown in FIG. 22, a heating means 11 is allowed to move above and across an L1 side of the first end portion 20A in the length direction L. More specifically, in this embodiment, the heating means 11 is allowed to move above and across the first end portion 20A from T1 side to T2 side of the thickness direction T. Thus, the first end portion 20A is heated and thus softened. Then, the first end portion 20A is sealed.

Figure 23:
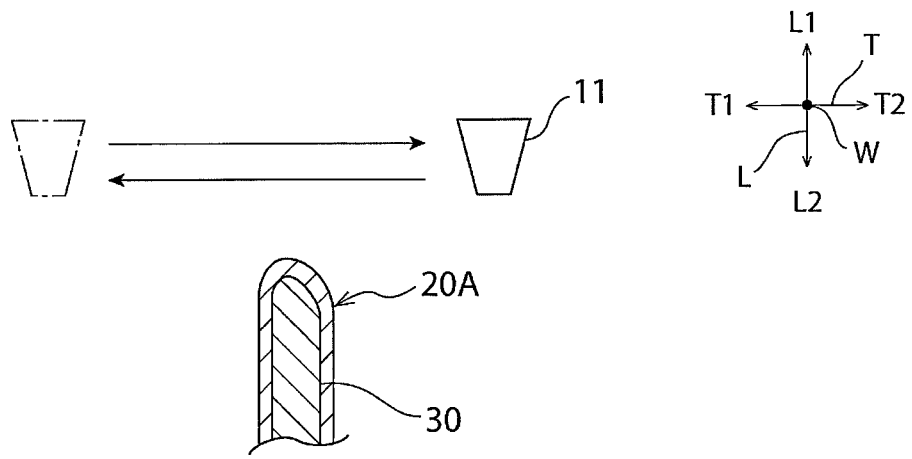
FIG. 23 is a schematic side view for illustrating the step of sealing the first end portion of the phosphor-encapsulating capillary tube in the second embodiment.
Figure 24:
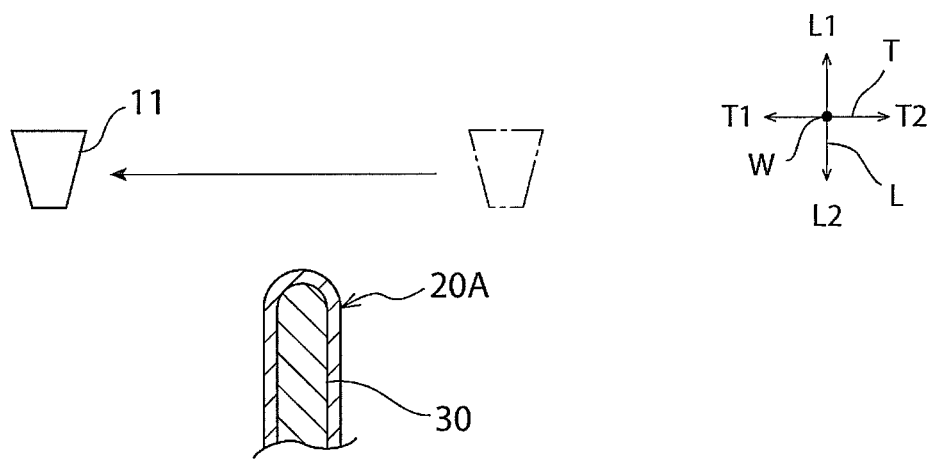
FIG. 24 is a schematic side view for illustrating the step of sealing the first end portion of the phosphor-encapsulating capillary tube in the second embodiment.

Next, the fourth heating step is performed. Specifically, as shown in FIG. 23, the heating means 11 is allowed to move above and across the L1 side of the first end portion 20A in the length direction L reversely to the third heating step. In other words, the heating means 11 is allowed to move above and across the first end portion 20A from T2 side to T1 side of the thickness direction T. Thus, as shown in FIG. 24, the sealed first end portion 20A is heated again to get it into shape.

Note that although this embodiment describes an example in which in the third and fourth heating steps the heating means 11 is moved in the thickness direction T, the direction of movement of the heating means in the present invention is not limited to the thickness direction. The heating means may be moved in the width direction or moved in any direction inclined to the width direction and thickness direction.

Furthermore, this embodiment describes an example in which the third and fourth heating steps are performed once for each step. However, the present invention is not limited to this. The third and fourth heating steps may be repeated a plurality of times.

Although the same heating means 11 as used in the first and second heating steps can be used, the heating means used in the first and second heating steps may be different from the heating means used in the third and fourth heating steps.

Note that the heating temperature and moving speed of the heating means 11 in the third and fourth heating steps are set at values to avoid that the first end portion 20A becomes larger in size than the remaining portion of the phosphor-encapsulating capillary tube 20.

(Wavelength-Converting Member 13)

Figure 25:
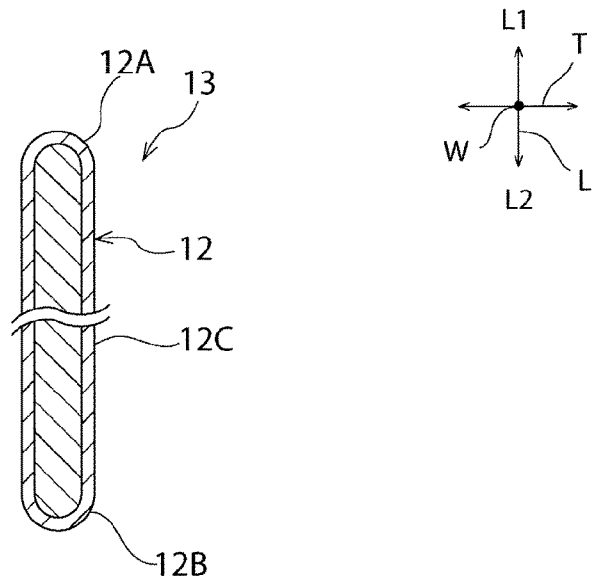
FIG. 25 is a schematic cross-sectional view of a wavelength-converting member in the second embodiment.

A wavelength-converting member 13 shown in FIG. 25 is produced by the steps so far. The wavelength-converting member 13 includes a glass capillary tube 12 sealed at both end portions 12A, 12B. The size of both end portions 12A, 12B of the glass capillary tube 12 is not larger than that of the middle portion 12C thereof. The outer shape of the transverse cross-section of the middle portion 12C is an elongate shape, more specifically, a rectangular shape. A phosphor 30 is encapsulated in the glass capillary tube 12.

As described above, in this embodiment, an elongate glass capillary tube 10 is used. Therefore, the outer shape of the transverse cross-section is elongate, more specifically rectangular, so that a wavelength-converting member 13 capable of being disposed in proximity to a light guide can be produced.

Furthermore, the sealing of each of the second end portion 10B and the first end portion 20A is done by two heating steps. First, in the first or third heating step, the heating means 11 is allowed to move above and across the second end portion 10B or first end portion 20A from the T1 side to the T2 side. When this step is done, the time for radiation of a laser light to the T2 side region 10B2, 20A2 of the second end portion 10B or first end portion 20A becomes longer than the time for radiation of the laser light to the T1 side region 10B1, 20A1 thereof. Therefore, the temperature of the regions 10B2, 20A2 becomes higher than that of the regions 10B1, 20A1. Hence, as shown in FIGS. 18 and 23, the second end portion 10B and the first end portion 20A become asymmetric.

On the other hand, in the second or fourth heating step, the T1 side region of the second end portion 10B or first end portion 20A has a higher temperature than the T2 side region thereof. Therefore, the softening of the T1 side region is promoted, so that, as shown in FIGS. 19 and 24, the shape of the second end portion 10B or the first end portion 20A becomes symmetric.

Figure 27:
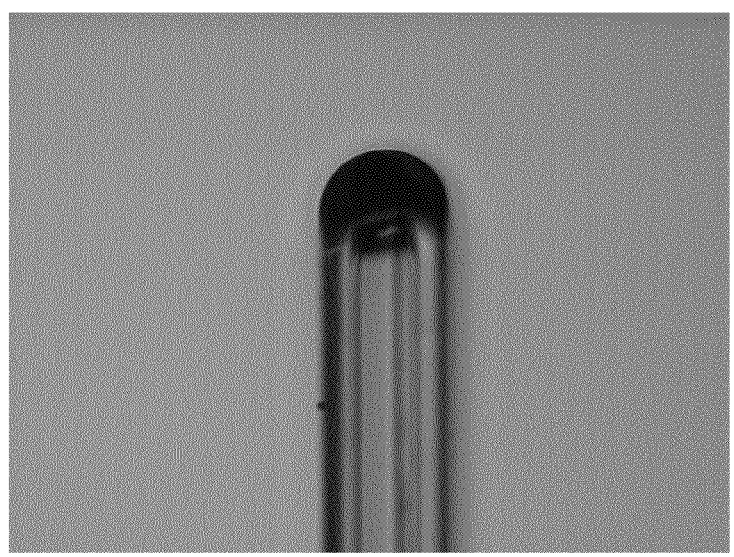
FIG. 27 is a lateral photograph of an end portion of the wavelength-converting member as viewed from a width direction.
Figure 28:
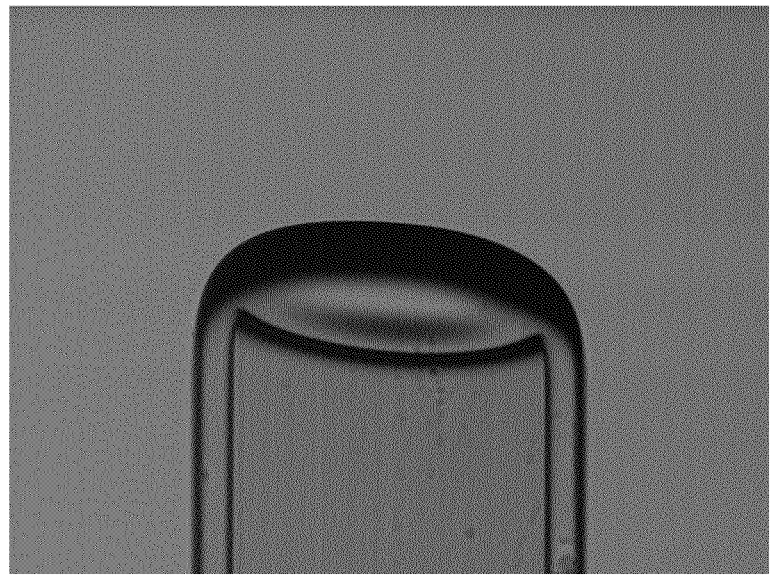
FIG. 28 is a lateral photograph of the end portion of the wavelength-converting member as viewed from a thickness direction.

By performing the first or third heating step and the second or fourth heating step in the above manner, the shape of both end portions of the resultant wavelength-converting member 13 can approach a symmetric shape as shown in FIGS. 27 and 16 and, concurrently, the size of both end portions can be reduced, for example, below that of the remaining portion. Therefore, with the method of this embodiment, a wavelength-converting member 13 capable of being disposed in further proximity to a light guide can be produced.

Note that, usually, the sealing of the end portion is done not by scanning a heating means but by a heating means disposed opposite to the end portion. In this case, however, the size of the sealed end portion becomes larger than that of the remaining portion. Therefore, a wavelength-converting member produced in such a sealing method cannot be disposed in sufficient proximity to a light guide.

In this embodiment, in the first to fourth heating steps, the heating means 11 is moved in the thickness direction T. By doing this, it can be easily prevented that the size of the end portion becomes larger than that of the remaining portion, as compared with, for example, the case where the heating means is moved in the width direction.

In this embodiment, a laser radiation device is used as the heating means 11. By doing this, more localized heating is possible as compared with, for example, the case where a burner is used as the heating means. Therefore, the symmetry of the shape of the end portions 12A, 12B can be further improved.

Figure 26:
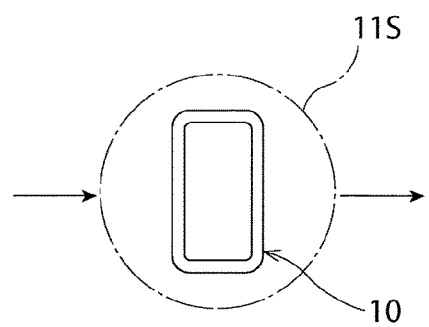
FIG. 26 is a schematic plan view for illustrating the shape of a spot diameter of a laser in a first modification of the second embodiment.

For example, a laser radiation device may be used in which the shape of a spot 11S is circular as shown in FIG. 26. In this case, however, the time for radiation of a laser light to the end portion 10B, 20A in the first to fourth heating steps will vary in the width direction W. Specifically, the middle region of the end portion 10B, 20A in the width direction W is irradiated with a laser light for a long time but the edge regions thereof are irradiated with the laser light only for a short time. Therefore, the symmetry of the shape of the sealed end portion 10B, 20A may be degraded and the middle region may be excessively heated to have a larger dimension.

In contrast, in this embodiment, the shape of the spot 11S is elongate, which reduces variations in time for radiation of a laser light to the end portion 10B, 20A in the width direction W. Therefore, it can be effectively prevented that the middle region has a larger dimension. As a result, a wavelength-converting member 13 capable of being disposed in further proximity to a light guide can be produced.

Figure 29:
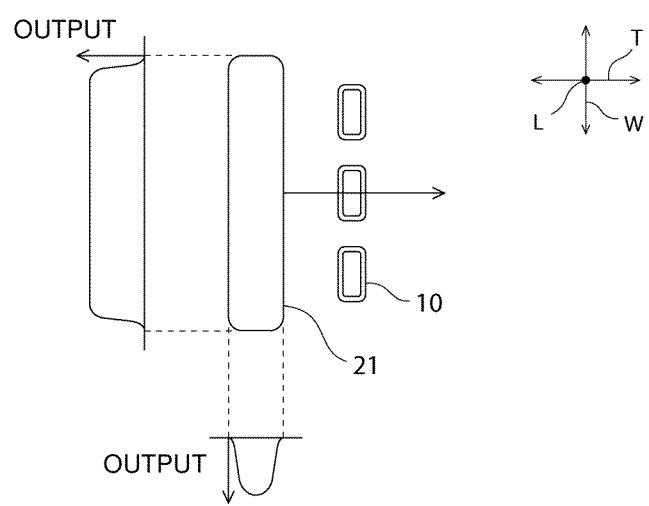
FIG. 29 is a schematic plan view for illustrating the shape of a spot diameter of a laser and an output distribution of the laser in a second modification of the second embodiment.

Furthermore, when the shape of the spot 11S is elongate as in this embodiment, it is preferred to use a laser radiation device that can emit a laser light the intensity of which is approximately constant in the middle portion of the spot 11S of the laser light in the width direction W of the glass capillary tube 10 as shown in FIG. 29. In this case, by irradiating a plurality of glass capillary tubes 10 aligned along the width direction W with a laser light, the end portions of the plurality of glass capillary tubes 10 can be suitably sealed in common heating steps.

<<Modifications>>

The method for producing a phosphor-encapsulating capillary tube described in the first embodiment can also be suitably applied to the production of the phosphor-encapsulating capillary tube described in the second embodiment. Likewise, the method for producing a phosphor-encapsulating capillary tube described in the second embodiment can also be suitably applied to the production of the phosphor-encapsulating capillary tube described in the first embodiment.

Figure 30:
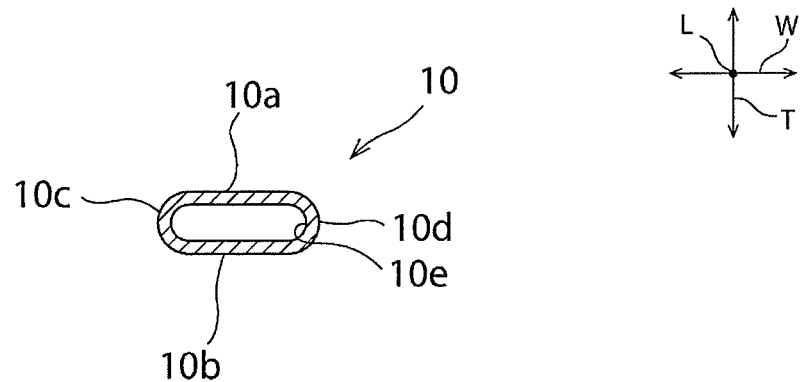
FIG. 30 is a schematic transverse cross-sectional view of a glass capillary tube in a modification.

The first and second embodiments have described an example in which each of the inner shape and outer shape of the transverse cross-section of the glass capillary tube 10 is approximately rectangular. However, the present invention is not limited to this configuration. As shown in FIG. 30, each of the inner shape and outer shape of the transverse cross-section of the glass capillary tube 10 may be oval. Alternatively, each of the inner shape and outer shape of the transverse cross-section of the glass capillary tube may be elliptical.

Figure 31:
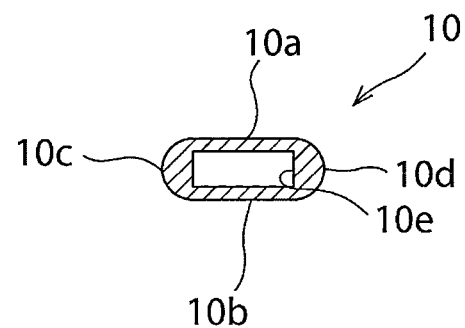
FIG. 31 is a schematic transverse cross-sectional view of a glass capillary tube in a modification.

As shown in FIG. 31, the inner shape of the transverse cross-section of the glass capillary tube 10 may be approximately rectangular, while the outer shape thereof may be oval or elliptical.

Figure 32:
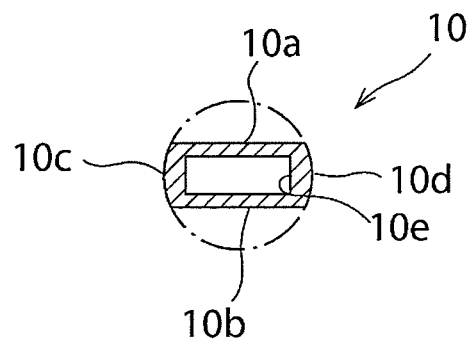
FIG. 32 is a schematic transverse cross-sectional view of a glass capillary tube in a modification.

As shown in FIG. 32, the inner shape of the transverse cross-section of the glass capillary tube 10 may be approximately rectangular, while the outer shape thereof may be an approximately rectangular shape in which two sides opposed in the width direction bulge outward.

REFERENCE SIGNS LIST

10 . . . glass capillary tube
10A, 10B . . . end portion of glass capillary tube
10A1 . . . circular cross-sectional portion
10a . . . first side wall
10b . . . second side wall
10c . . . third side wall
10d . . . fourth side wall
10e . . . through hole
11 . . . heating means
11S . . . spot
13 . . . wavelength-converting member
20 . . . phosphor-encapsulating capillary tube
20A . . . first end portion of phosphor-encapsulating capillary tube
20B . . . second end portion of phosphor-encapsulating capillary tube
21 . . . capillary tube body
21a . . . through hole
22 . . . sealing part
22a . . . recess
23 . . . side wall portion
24 . . . bottom wall portion
25 . . . indent

The invention claimed is:

1. A phosphor-encapsulating capillary tube which is sealed at one end portion thereof and open at the other end portion thereof and into which a phosphor is to be injected through the other end portion thereof, the phosphor-encapsulating capillary tube comprising:
a capillary tube body of a straight tube shape in which the outer shape of a transverse cross-section thereof is an elongate shape elongated in a width direction thereof and the thickness thereof is an approximately constant, the capillary tube body including flat plate side walls opposed to each other; and
a sealing part sealing one end portion of the capillary tube body,
wherein the sealing part is formed so that an outside diameter of the sealing part in the width direction gradually decreases toward a distal end thereof and an outside diameter of the sealing part in a thickness direction perpendicular to the width direction gradually increases and then gradually decreases toward the distal end thereof.

2. The phosphor-encapsulating capillary tube according to claim 1, wherein a maximum outside diameter of the sealing part in the thickness direction is 1.1 to 3.0 times an outside diameter of the capillary tube body along the thickness direction.

3. The phosphor-encapsulating capillary tube according to claim 1, wherein
the sealing part has a side wall portion and a bottom wall portion which define a recess opening into a through hole in the capillary tube body, and
at least a region of the bottom wall portion is formed with a flat surface having a normal direction parallel to a central axis of the capillary tube body.

4. The phosphor-encapsulating capillary tube according to claim 3, wherein a central region of the bottom wall portion is formed so that the normal direction thereof is oriented to the central axis of the capillary tube body.

5. The phosphor-encapsulating capillary tube according to claim 3, wherein the bottom wall portion is located closer to the center of the capillary tube in a direction of extension of the central axis of the capillary tube body than a portion of the sealing part having a maximum outside diameter in the thickness direction.

6. The phosphor-encapsulating capillary tube according to claim 1, wherein the capillary tube body is formed in a rectangular tube shape.

7. A wavelength-converting member comprising:
a capillary tube sealed at both end portions; and
a phosphor encapsulated in the capillary tube,
wherein
the capillary tube comprises:
a capillary tube body of a straight tube shape in which the outer shape of a transverse cross-section thereof is an elongate shape elongated in a width direction thereof and the thickness thereof is an approximately constant, the capillary tube body including flat plate side walls opposed to each other;
a first sealing part sealing one end portion of the capillary tube body; and
a second sealing part sealing the other end portion of the capillary tube body, and at least one of the first and second sealing parts is formed so that an outside diameter thereof in the width direction gradually decreases toward a distal end thereof and an outside diameter thereof in a thickness direction perpendicular to the width direction gradually increases and then gradually decreases toward the distal end thereof.

* * * * *